US011708158B2

(12) United States Patent
Mores et al.

(10) Patent No.: US 11,708,158 B2
(45) Date of Patent: Jul. 25, 2023

(54) AIRCRAFT WITH RIGHT AND LEFT PROPULSION UNIT SUPPORT BEAMS EXTENDING BETWEEN MAIN AND AFT WINGS

(71) Applicant: Volocopter GmbH, Bruchsal (DE)

(72) Inventors: Sebastian Mores, Munich (DE); Tobias Vermeulen, Munich (DE); Ulrich Schaferlein, Karlsdorf (DE)

(73) Assignee: Volocopter GmbH, Bruchsal (DE)

( * ) Notice: Subject to any disclaimer, the term of this patent is extended or adjusted under 35 U.S.C. 154(b) by 319 days.

(21) Appl. No.: 16/887,071

(22) Filed: May 29, 2020

(65) Prior Publication Data

US 2020/0407055 A1   Dec. 31, 2020

(30) Foreign Application Priority Data

Jun. 27, 2019   (EP) .................................... 19182947

(51) Int. Cl.
| | | |
|---|---|---|
| *B64C 11/46* | (2006.01) | |
| *B64C 29/00* | (2006.01) | |
| *B64C 5/06* | (2006.01) | |
| *B64C 39/06* | (2006.01) | |
| *B64C 39/08* | (2006.01) | |
| *B64D 27/24* | (2006.01) | |

(52) U.S. Cl.
CPC ............ *B64C 29/0025* (2013.01); *B64C 5/06* (2013.01); *B64C 11/46* (2013.01); *B64C 39/068* (2013.01); *B64C 39/08* (2013.01); *B64D 27/24* (2013.01)

(58) Field of Classification Search
CPC ......... B64C 11/46; B64C 27/22; B64C 27/26; B64C 39/068; B64C 29/02
See application file for complete search history.

(56) References Cited

U.S. PATENT DOCUMENTS

| | | | |
|---|---|---|---|
| 3,834,654 A | 9/1974 | Miranda | |
| D311,720 S | 10/1990 | Butler | |
| 6,293,491 B1 * | 9/2001 | Wobben | ................. B64D 27/24 244/17.23 |
| 7,159,817 B2 * | 1/2007 | VanderMey | ............ B64C 39/08 244/17.23 |
| 9,120,560 B1 * | 9/2015 | Armer | ................. B64C 29/0025 |
| 9,499,266 B1 | 11/2016 | Garreau | |
| 10,029,785 B2 * | 7/2018 | Niedzballa | ............. B64D 27/02 |

(Continued)

FOREIGN PATENT DOCUMENTS

| | | |
|---|---|---|
| CN | 107745809 | 3/2018 |
| WO | 2019007433 | 1/2019 |

*Primary Examiner* — Philip J Bonzell
(74) *Attorney, Agent, or Firm* — Volpe Koenig (57) ABSTRACT

A VTOL aircraft (1), including: a fuselage (2) for transporting passengers and/or load; a front wing (3) attached to the fuselage (2); an aft wing (4) attached to the fuselage (2), behind the front wing (3) in a direction of forward flight (FF); a right connecting beam (5a) and a left connecting beam (5b), which connecting beams (5a, 5b) structurally connect the front wing (3) and the aft wing (4), which connecting beams (5a, 5b) are spaced apart from the fuselage (2); and at least two propulsion units (6) on each one of the connecting beams (5a, 5b). The propulsion units (6) include at least one propeller (6b, 6b') and at least one motor (6a) driving the propeller (6b, 6b'), preferably an electric motor, and are arranged with their respective propeller axis in an essentially vertical orientation (z).

18 Claims, 4 Drawing Sheets

(56) References Cited

U.S. PATENT DOCUMENTS

| | | | |
|---|---|---|---|
| 10,081,436 B1* | 9/2018 | Tian | B64C 29/0025 |
| 10,322,814 B1* | 6/2019 | Tian | B64C 39/04 |
| 10,472,058 B2* | 11/2019 | Tian | B64C 11/46 |
| 10,472,064 B2* | 11/2019 | Tian | B64C 39/04 |
| 11,267,570 B2* | 3/2022 | Villa | B64C 9/38 |
| 2006/0151666 A1* | 7/2006 | VanderMey | B64C 29/0016 244/12.3 |
| 2011/0031355 A1 | 2/2011 | Alvarez Calderon F. | |
| 2016/0236774 A1* | 8/2016 | Niedzballa | B64D 27/24 |
| 2018/0105268 A1 | 4/2018 | Tighe et al. | |
| 2019/0061968 A1* | 2/2019 | Tian | B64C 39/024 |
| 2019/0127056 A1* | 5/2019 | Weekes | B64C 39/024 |
| 2019/0233077 A1* | 8/2019 | Tian | B64C 27/26 |
| 2019/0233098 A1* | 8/2019 | Tian | B64C 11/46 |
| 2019/0233107 A1* | 8/2019 | Tian | B64C 39/024 |
| 2019/0337613 A1* | 11/2019 | Villa | B64C 27/10 |
| 2021/0362866 A1* | 11/2021 | Tian | B64C 25/06 |
| 2022/0009626 A1* | 1/2022 | Baharav | B64C 39/04 |

* cited by examiner

AIRCRAFT WITH RIGHT AND LEFT PROPULSION UNIT SUPPORT BEAMS EXTENDING BETWEEN MAIN AND AFT WINGS

INCORPORATION BY REFERENCE

The following documents are incorporated herein by reference as if fully set forth: European Patent application No. 19 182 947.2, filed Jun. 27, 2019.

TECHNICAL FIELD

The invention relates to a vertical take-off and landing (VTOL) aircraft, in particular with electrically powered propulsion units, a so-called eVTOL aircraft.

BACKGROUND

Somewhat similar aircraft designs are disclosed, e.g., in USD 311720 S, U.S. Pat. Nos. 3,834,654 A and 9,499,266 B1.

Generally, contemporary eVTOL aircraft designs suffer from poor aerodynamic efficiency design since they incorporate several systems in order to vertically lift the aircraft as well as to move it horizontally. In particular, none of the known designs can be regarded as naturally stable aircrafts. Examples for known designs comprise aircrafts by Zee Aero/Cora, cf. US 2018/105268 A1; EmbraerX; Aurora FlightScience; CityAirbus & Project Zero; AutoflightX, cf. U.S. Pat. No. 10,081,436 B1.

None of the known designs achieves a comfortable passenger entry into the fuselage. All known designs lead to an unfavorable solution for passengers entering the aircraft. This is mainly due to the low vertical position of the propulsion and lifting system.

Most known designs have high aerodynamical blockages (or installation losses) of aircraft parts within the lifting propeller airflow during hover/low-speed conditions (cf. UBER elevate crm003), which leads to high power losses during hover and transition flight.

Most known designs have lifting propellers aft of each other. The greater the number, the higher the aerodynamic losses will be for each propeller, which leads to (an unnecessarily) high power consumption and thus increased overall aircraft weight or reduced travel range.

Most known designs are not scalable in size and are already greater than 10 m in span with a relatively low amount of payload. Hence scaling up to higher payloads and/or passenger capacity will result in even bigger aircraft sizes. However, landing sites are limited in size, especially in urban areas, and with increasing size, weight will increase over-proportionally.

Most known configurations have many, low diameter lifting propellers which have therefore a higher disk load which leads to an increased noise level.

The known designs lack a structurally integrated aircraft architecture that leads to high weight penalties or an aircraft with a low payload empty weight ratio.

SUMMARY

It is the object of the invention to propose a novel VTOL aircraft design which overcomes most if not all of the above disadvantages, thus achieving a VTOL aircraft with increased natural stability, increased aerodynamic efficiency, reduced weight, noise level and power consumption as well as better scalability.

This object is achieved by means of a VTOL aircraft having one or more of the features disclosed herein. Advantageous further developments of such an aircraft are defined below and in the claims A VTOL aircraft according to the present invention comprises: a fuselage, which may be optimized aerodynamically, for transporting passengers and/or load; a front or main wing attached to the fuselage, preferably at a top portion thereof; an aft wing attached to the fuselage, said aft wing being located behind the front wing in a direction of forward flight; a right connecting beam and a left connecting beam, which connecting beams structurally connect the front wing and the aft wing, which connecting beams are arranged spaced apart from the fuselage; and at least two propulsion units on each one of the connecting beams, which propulsion units comprise at least one propeller and at least one motor driving said propeller, preferably an electric motor, and are arranged with their respective propeller axis in an essentially vertical orientation. More specifically, the propulsion units could also be devised as ducted fans, jets, turbofans, turbojets or the like.

In the present context, "vertical" or "vertical direction" designates a direction essentially along a vertical or yaw axis of the aircraft.

The right and left connecting beams, besides mechanically connecting the front wing and the aft wing and thereby reducing torsion moments due to lifting forces, serve to accommodate the at least two (vertically arranged) propulsion units (lifting units).

Main design elements of the proposed aircraft are: a (aerodynamically optimized) fuselage; a (main) front wing; an aft wing; right and left connecting beams, structurally connecting front and aft wings; and at least two propulsion units on each one of the connecting beams, in a (essentially) vertical orientation. "Essentially vertical" means that small angular deviations from the vertical direction of the order of up to 10°, preferably up to 5°, shall be permitted.

In a further embodiment of the aircraft according to the invention, the at least two, preferably three, propulsion units are arranged behind each other in direction of forward flight, preferably at different heights, wherein preferably a propulsion unit located more toward a rear of the aircraft is located higher in a direction essentially along a vertical or yaw axis of the aircraft, i.e., in the vertical direction. To achieve this, the connecting beams may rise or slant upwards from the front to the rear of the aircraft in the vertical direction.

Preferably, there is a third propulsion unit arranged on each connecting beam, respectively, said third propulsion unit being located between the front wing and the aft wing. This can generate additional lifting thrust while avoiding any blocking of aircraft parts located below. Generally, the invention is not limited to any particular number of propulsion units.

In a further embodiment of the aircraft according to the invention, the connecting beams extend in the direction of forward flight beyond the front wing, and at least one of the propulsion units on each side is located on a respective connecting beam in front of the front wing in the direction of forward flight; and/or the connecting beams extend beyond the aft wing in a rearward direction, and at least one of the propulsion units on each side is located on a respective connecting beam behind the aft wing. Therefore, it is possible to locate the at least two propulsion units (for each connecting beam) in a way that the airflow is disturbed as little as possible in a hover or vertical flight direction.

In a further embodiment of the aircraft according to the invention, the front wing extends from a top portion of the fuselage orthogonally (sideways) w.r.t. (with respect to) the direction of forward flight, preferably sloping upwards in a direction away from the fuselage. This has proved advantageous in order to achieve stable flight.

In a further embodiment of the aircraft according to the invention, tip regions of the front wing have an inclination opposite the direction of forward flight (backward sweep) when seen in a direction along a vertical or yaw axis of the aircraft. This has proved advantageous in order to reduce aerodynamic interferences with the aft-laying mid-lifting propulsion units.

In a further embodiment of the aircraft according to the invention, the aft wing is devised as a box-wing, comprising an upper aft wing and a lower aft wing. These aft wings are arranged distanced to each other in a direction along a vertical or yaw axis of the aircraft and are structurally connected by at least one outer vertical stabilizer located at corresponding ends of the upper aft wing and the lower aft wing, respectively. The upper aft wing serves primarily as a lifting wing, hence induces lift in order to carry a portion of the weight of the aircraft, whereas the lower aft wing serves as a horizontal stabilizer, in order to counterbalance the aircraft's pitching moment around its center of gravity (CoG), and thus is preferably located relatively far behind the CoG in a direction of airflow (airflow direction is generally opposite the direction of forward flight).

Box-wings as such are known to a person skilled in the art as a design of two wings which are placed distanced to each other in a vertical direction yet interconnected at the end of each wing by a vertical stabilizer, as detailed above. This provides structural stiffness as well as aerodynamic benefits.

In a further embodiment of the aircraft according to the invention, the lower aft wing is mechanically and preferably directly connected to a rear part, in the direction of forward flight, of the fuselage, and the upper aft wing is connected to the rear part of the fuselage via at least one, preferably two inner vertical stabilizers. This provides increased stability. It is also possible that the upper aft wing is directly connected to the fuselage whereas the lower aft wing is connected to the fuselage, e.g., via vertically extending stabilizers. Furthermore, other ways to connect the upper and lower aft wing known to a person skilled in the art are not excluded from this invention.

In a further embodiment of the aircraft according to the invention, the outer vertical stabilizers are slanted outwardly from the fuselage, whereby the upper aft wing extends further away from the fuselage than the lower aft wing.

In a further embodiment of the aircraft according to the invention, the lower aft wing, i.e., the horizontal stabilizer, is designed to produce minimal drag in forward flight while producing essentially no or minimal lift. This can be achieved, according to a further embodiment of the aircraft according to the invention, in that the lower aft wing is essentially symmetrical in cross section, with less airfoil inclination w.r.t. the direction of forward flight than the front wing and the upper aft wing. As known to a skilled person, an airfoil is the cross-sectional shape of a wing, blade (of a propeller, rotor, or turbine), or sail (as seen in cross-section).

Owing to this particular feature, in case of a gust, or a flight maneuver, leading to a nose-down movement of the aircraft, an angle of attack on the wings (front and aft) decreases, thus leading to less lift. Yet due to the airfoil of the horizontal stabilizer with less airfoil inclination (and being essentially symmetrical in shape), a downward directed force (negative lift) is generated, creating a stabilizing (nose-up) moment around the CoG.

Vice versa, if the aircraft experiences a nose-up movement, the angle of attack on the wings (front and aft) increases, thus producing an increased lift (including possible stall effects if the angle of attack is too high). Yet due to the airfoil of the horizontal stabilizer with less airfoil inclination (i.e., with a smaller geometric angle of attack, leading also to less stall sensitiveness) and being essentially symmetrical in shape, this results in a positive lift force. In total, the lift of the wings aft of the CoG (upper and lower aft wings) will produce a moment that is greater than the moment of the front wing, leading to a nose-down movement which stabilizes the aircraft. It is also part of the invention that the lift/download of the horizontal stabilizer could be actively controlled, e.g. via trailing edge flaps, In a further embodiment of the aircraft according to the invention, in addition to the vertically oriented propulsion units, preferably in front of a leading edge of the aft wing, in particular the lower aft wing, there is at least one essentially horizontally oriented propulsion unit arranged at the rear of the fuselage in the direction of forward flight. This can help to achieve a more efficient forward flight. Preferably, there are two horizontally oriented propulsion units located on the right side and the left side of the fuselage, respectively. To reduce a momentum around the roll axis, they are preferably counter-rotating and symmetrical w.r.t. the FF-axis and yaw-axis plane.

Owing to the fact that the at least one essentially horizontally oriented propulsion unit can be located in front of a leading edge of the aft wing, in particular the lower aft wing, this particular feature may lead to a forced airflow onto the (lower) aft wing due to the presence of the corresponding propeller(s). This will reduce or avoid stall effects on the stabilizing wing (in particular said lower aft wing) if the angle of attack is too high/low.

In a further embodiment of the aircraft according to the invention, a diameter of the propeller of the at least one essentially horizontally oriented propulsion unit is dimensioned smaller than the propellers of the vertically oriented propulsion units, preferably having about 20%-80%, most preferably about 40%-60%, of a diameter of the propellers of the vertically oriented propulsion units.

In a further embodiment of the aircraft according to the invention, the propeller of the at least one essentially horizontally oriented propulsion unit has a number of rotor blades which is different, in particular greater, than a number of rotor blades of the propellers of the vertically oriented propulsion units. Preferably, the vertically oriented propulsion units have propellers with a same number of rotor blades, particularly three. However, the number of the rotor blades can of course also vary, if desired to improve noise footprint and sound characteristics. On the other hand, six may be a preferred value for the number of rotor blades for the essentially horizontally oriented propulsion unit.

However, in some embodiments of the invention it can be advantageous that the number of rotor blades of the vertically and/or horizontally oriented propulsion units are different. Varying numbers of rotor blades can improve the noise footprint and sound characteristic in a beneficial way.

In a further embodiment of the aircraft according to the invention, the connecting beams extend essentially parallel to the forward flight direction, which has proved advantageous.

In a further embodiment of the aircraft according to the invention, a distance between the connecting beams decreases at least in a direction toward a rear of the aircraft in the direction of forward flight. Therefore, the airflow from the at least two propulsion units, which are arranged one after the other on each of the beams interact as little as possible, since they do not (at least not completely) overlap, when looked upon along a roll axis of the aircraft. This, in turn, results in better efficiency of the respective aft-lying propulsion units. This effect can be increased even further if the aft-lying propulsion units are arranged higher, with respect to a vertical axis (z), than the front-lying propulsion units. To this end, the connecting beams may slant upwards in said flow direction.

In a further embodiment of the aircraft according to the invention, in the direction of forward flight or opposite thereto, a distance between a propeller axis of the vertically oriented propulsion units and any one of the front and aft wings at least corresponds to a radius of the corresponding propeller. In this way, said wings are not located within the downward airflow stemming from said propellers. More specifically, the rotational axes of the foremost (or front-most) propulsion units are arranged at least further front of the front wing than the radii of the propellers of said propulsion units. Likewise, the rearmost propulsion units are arranged at least further aft of the aft wing than the radii of the propellers of the propulsion units.

In a further embodiment of the aircraft according to the invention, a center of gravity (CoG) of the aircraft is located between the front and aft wing w.r.t. to the direction of forward flight. Preferably, a lifting center of the aircraft is located aft of the center of gravity w.r.t. to the direction of forward flight. This can be achieved, e.g., if the combined lifting center of the front wing and the rear or aft wing, respectively, is shifted aft of the aircraft center of gravity.

In a further embodiment of the aircraft according to the invention, in order to further enhance the advantage of reduced propeller downwash onto the wings, the front wing generally (apart from its tips) has a forward sweep, which is an inclination in the direction of forward flight when seen in a direction along a vertical or yaw axis (z-axis) of the aircraft.

In a further embodiment of the aircraft according to the invention, rotor diameters of the vertically oriented propellers, which—preferably being as big as possible—are between 10%<D<35% of an overall dimension, D, of the aircraft, wherein D is the diameter of an imaginary circle laid around the aircraft, when looking along a yaw axis thereof. This is highly advantageous in urban areas since it can place an upper bound on overall aircraft seize. In another embodiment of the aircraft according to the invention, it can be advantageous that the propeller diameters vary. For instance, the middle propellers could have a smaller diameter than the front-most and aft-most propellers. Furthermore, it can also be advantageous that all propellers have different diameters. In both cases the noise footprint and sound characteristics can be improved in a beneficial way.

In yet a further embodiment of the aircraft according to the invention, in case of at least three vertically oriented propulsion units, the two front-most (or foremost) and the two aft-most propellers, respectively, have a larger diameter than the middle propellers. The connecting beams can be extended to the front and the aft with a higher degree of freedom as the wings can be moved apart.

In this way, the proposed aircraft design contributes to solve the above-mentioned issues by enabling
  reducing the number of vertically arranged lifting propellers which are located aft of each other;
  utilizing a tandem wing configuration (front and aft wings) which comprises structural means (connecting beams) for mounting vertically arranged lifting propellers and which are positioned in a manner that the propeller down wash during hover or transitional flight is not blocked by any major items (e.g., wings);
  utilizing a boxed wing concept at the aft of the aircraft in order to comprise one part of the tandem wing and a horizontal stabilizing surface in order to create an aero-mechanically stable aircraft during forward flight and reduce any disturbances occurring while the aircraft is operated. This further enables provision of a horizontal stabilizer, which incorporates an optional further propulsion system that can be used for a more efficient forward flight.

BRIEF DESCRIPTION OF THE DRAWINGS

Additional features and advantages of the invention will now be described in connection with preferred embodiments thereof in connection with the appended drawing.

DETAILED DESCRIPTION

In the description, aircraft geometry is described w.r.t. the aircraft's roll axis (longitudinal axis, x-axis), pitch axis (y-axis or lateral axis) and a vertical axis (z axis or yaw axis), which are orthogonal to each other. "Front" indicates the forward direction during (normal) flight, "rear" is opposite thereto. "Right" and "left" are used as seen when looking forward during normal flight. "Up" is the direction toward increasing values of z; "down" is the opposite direction. "Horizontal" is a plane comprising or being parallel to said roll axis. "Flow direction" described a direction of airflow along the aircraft, which is generally along said roll axis, but may somewhat differ therefrom depending on an attitude of the aircraft, cf. FIGS. 2 to 4. These definitions are merely for purpose of orientation and do not limit the scope of the invention in any way.

Figure 1:
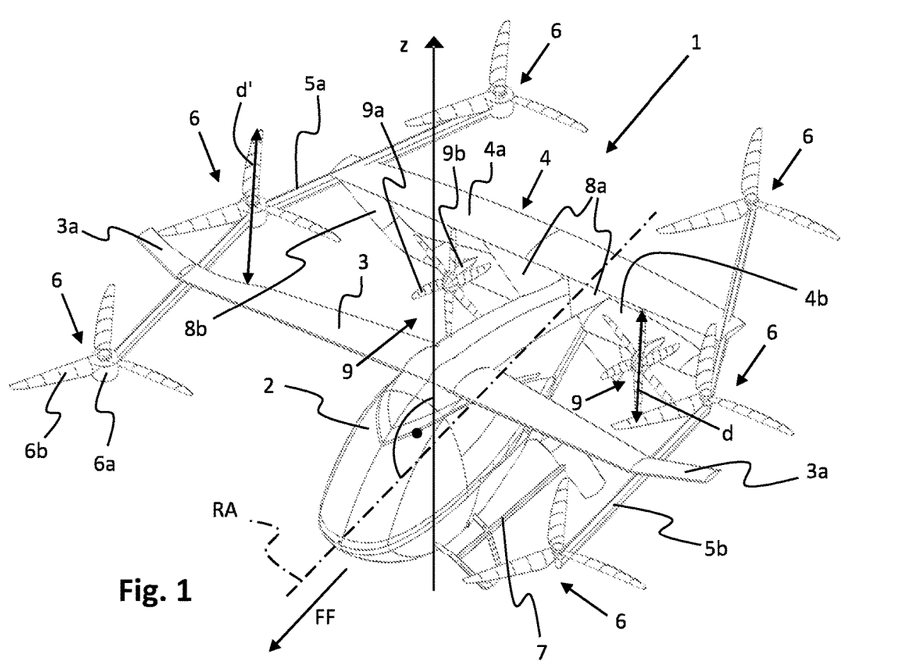
FIG. 1 shows a perspective view of an aircraft according to the invention.

FIG. 1 shows the overall design of an aircraft according to the present invention. The aircraft is denoted by reference numeral 1. It comprises a fuselage 2 for carrying passengers and/or load connected to a front wing 3 and to an aft wing 4. The aft wing 4 comprises an upper aft wing 4a and a lower aft wing 4b, which form a box wing. Tips 3a of front wing 3 and tips of upper aft wing 4a are connected by means of connecting beams. In the drawing, reference numeral 5a denotes a right side connecting beam whereas reference numeral 5b denotes a left side connecting beam. On the connecting beams 5a, 5b are located three propulsion units on each side of the aircraft 1, which propulsion units are denoted by reference numeral 6. These propulsion units 6 are also referred to as vertically oriented (or lifting) propulsion units and comprise an electric motor 6a coupled to a three blade propeller 6b for driving same. A respective propeller axis (not shown) is oriented in (positive) z-direction. Connecting beams 5a, 5b generally extend parallel to a roll axis RA of the aircraft 1. The most aft located propulsion units 6 are placed nearer to the fuselage, hence the connecting beams 5a and 5b are curved or bent in order to structurally support the propulsion units 6. In this way, a distance between the connecting beams 5a, 5b diminishes in a direction towards the rear of fuselage 2. In this way, rearmost propellers 6b are not directly located behind the other propellers in a flow direction, which is opposite a direction of forward flight denoted FF in FIG. 1.

Fuselage 2 is fitted with a landing gear 7. The tips 3a of front wing 3 are angled backwards, whereas the rest of front wing 3 has a forward sweep in the direction of forward flight FF. Front wing 3 this directly attached to the top of fuselage 2 and is slanted upwards, i.e., in positive z-direction, as denoted in FIG. 1 (cf. FIG. 5).

Lower aft wing 4b is also attached directly to fuselage 2 while upper aft wing 4a is attached to fuselage 2 via two vertical stabilisers denoted 8a. At respective tips thereof, upper aft wing 4a and the lower aft wing 4b are interconnected by means of further vertical stabilisers denoted 8b. Said further vertical stabilisers 8b are inclined outwardly with respect to fuselage 2 from lower aft wing 4b to upper aft wing 4a, i.e., upper aft wing 4a is longer than lower aft wing 4b.

Figure 5:
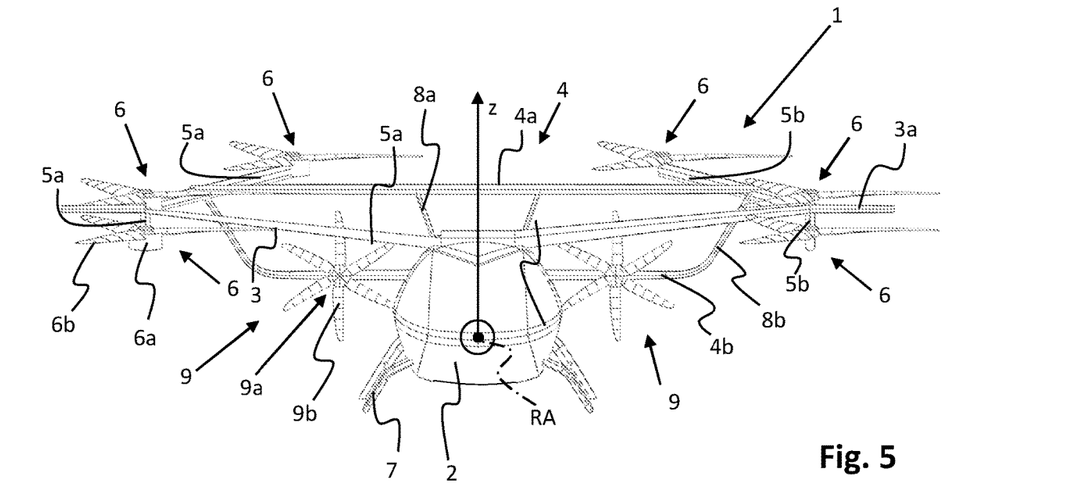
FIG. 5 shows the aircraft of FIG. 1 in a frontal view.

Upper aft wing 4a this located at a higher position in positive z-direction than front wing 3 (cf. FIG. 5). In this way, none of propellers 6b is directly located behind another propeller 6b in said flow direction.

On a front edge of lower aft wing 4b in said direction of forward flight FF there are located two horizontally oriented propulsion units 9, one to the right and one to the left of fuselage 2. While a propeller axis of vertically oriented propulsion units 6 is oriented essentially in positive z-direction, a propeller axis of horizontally oriented propulsion units 9 is oriented essentially parallel said roll axis RA. As can be gathered from FIG. 1, the propellers 6b of the vertically oriented propulsion units 6 have three propeller blades while the propellers 9b of the horizontally oriented propulsion units 9 have six propeller blades. Obviously, the present invention is not limited to any particular number of propeller blades, either for the vertically oriented propulsion units 6 or for the horizontally oriented propulsion units 9. Reference numeral 9a denotes an electric motor for driving respective propellers 9b of the horizontally oriented propulsion units 9. A respective propeller axis (not shown) is oriented in the direction of the roll axis RA. A diameter d of the propellers 9b of the horizontally oriented propulsion units 9 is dimensioned smaller than a diameter d' of the propellers 6b of the vertically oriented propulsion units 6, preferably having about 80% of a diameter d' of the propellers 6b of the vertically oriented propulsion units 6.

Figure 2:
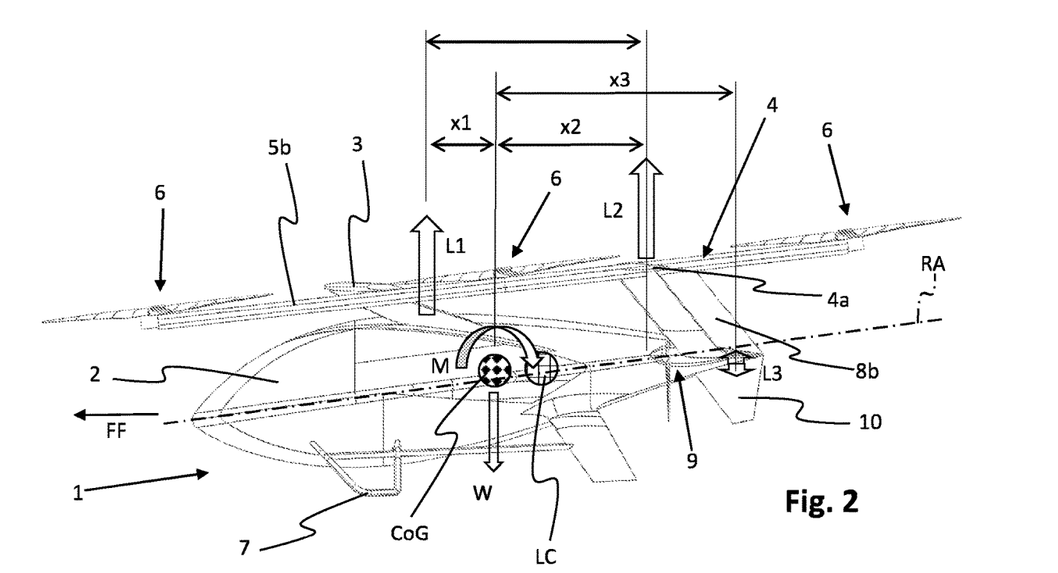
FIG. 2 shows a side elevational view of the aircraft in FIG. 1.

While front wing 3 and upper aft wing 4a have an airfoil which is designed to create substantial lift when the aircraft 1 is travelling in the direction of forward flight FF, lower aft wing 4b is of essentially symmetrical cross-section and therefore essentially does not create any lift when the aircraft 1 is travelling in the direction of forward flight FF. This is illustrated in FIG. 2, wherein reference numerals L1, L2, and L3 denote lifting forces as created by front wing 3, upper aft wing 4a, and lower aft wing 4b, respectively. Reference numeral W denotes a gravitational force (aircraft weight) acting on the aircraft's center of gravity CoG, while a combined lifting force L1+L2+L3 acts on the crafts lifting center denoted LC. Reference numerals x1, x2, and x3 denote a distance of front wing 3, upper aft wing 4a, and lower aft wing 4b, respectively, from the aircraft's center of gravity CoG. As can be gathered from FIG. 2, the aircraft's lifting center LC is located aft of the aircrafts center of gravity CoG with respect to the direction of forward flight FF. Reference M denotes a moment or torque (pitch momentum) around the aircraft's center of gravity CoG.

As stated previously, the CoG (Center of Gravity) is located between the front wing 3 and the aft wing 4 (w.r.t. said forward flight direction FF). Also, the LC (lifting center) is located aft the CoG (w.r.t. said forward flight direction FF). This can be done if the combination of the lifting center of the front wing 3 and the rear wing 4, respectively, is shifted aft of the aircraft's center of gravity CoG. In order to combine with the advantage of reduced propeller downwash on to the wings, the front wing 3 has a forward sweep.

Note: for the following calculations/equations it is assumed that the propulsion units do not contribute notably to the aircraft lift during cruise flight.

All three wings 3, 4a, 4b, with respective different lifting magnitudes, carry the aircraft weight W=L1+L2+L3. The aircraft's stability is defined by the direction and magnitude of the aircraft pitch momentum M around the CoG.

In normal flight attitude, illustrated in FIG. 2, the aircraft is stable defined with: $M_{forward\ flight}=L1^*x1-L2^*x2-L3^*x3$, where lower aft wing 4b, functioning as horizontal stabilizer, is essentially designed to produce minimal drag in forward flight, hence producing essentially no or minimal lift, cf. FIG. 2. Therefore, the third term of the equation is essentially zero during an ideal forward flight, leading to a balanced aircraft, i.e.:

$$M_{forward\ flight}=L1^*x1-L2^*x2-L3^*x3<0$$

$$\rightarrow M_{forward\ flight}=L1^*x1-L2^*x2-0$$

$$\rightarrow L1^*x1 \approx L2^*x2$$

Figure 3:
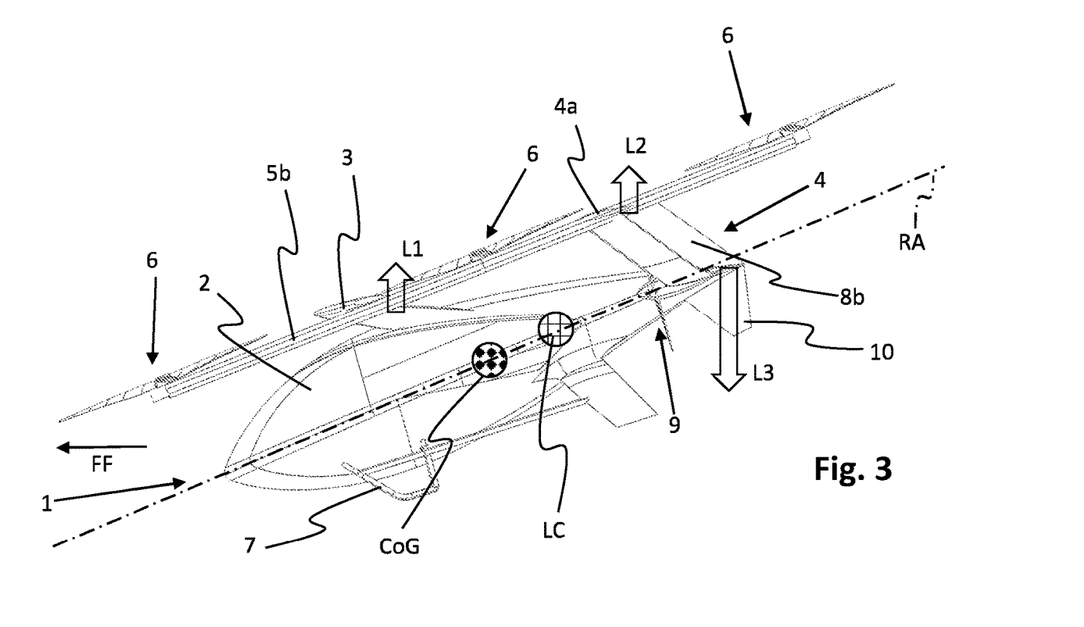
FIG. 3 shows the aircraft of FIG. 2 and forces acting thereupon in a nose-down configuration.

In case of a gust, or flight maneuver, leading to a nose-down movement of the aircraft 1, as depicted in FIG. 3, the angle of attack on the wings, i.e., front wing 3 and upper aft wing 4a decreases, leading to less lift L1, L2, L3. Yet due to the airfoil of the horizontal stabilizer (lower after wing 4b) with less airfoil inclination (and being essentially symmetrical in shape), it produces a downward directed force (negative lift), creating a stabilizing (nose-up) moment around the CoG with (approximately):

$$M_{down}=L1^*x1-L2^*x2-L3^*x3$$

$$\rightarrow M_{down} \approx 0-0-(-L3)^*x3$$

$$\rightarrow M_{down}=0-0+L3^*x3, \text{ being positive.}$$

Figure 4:
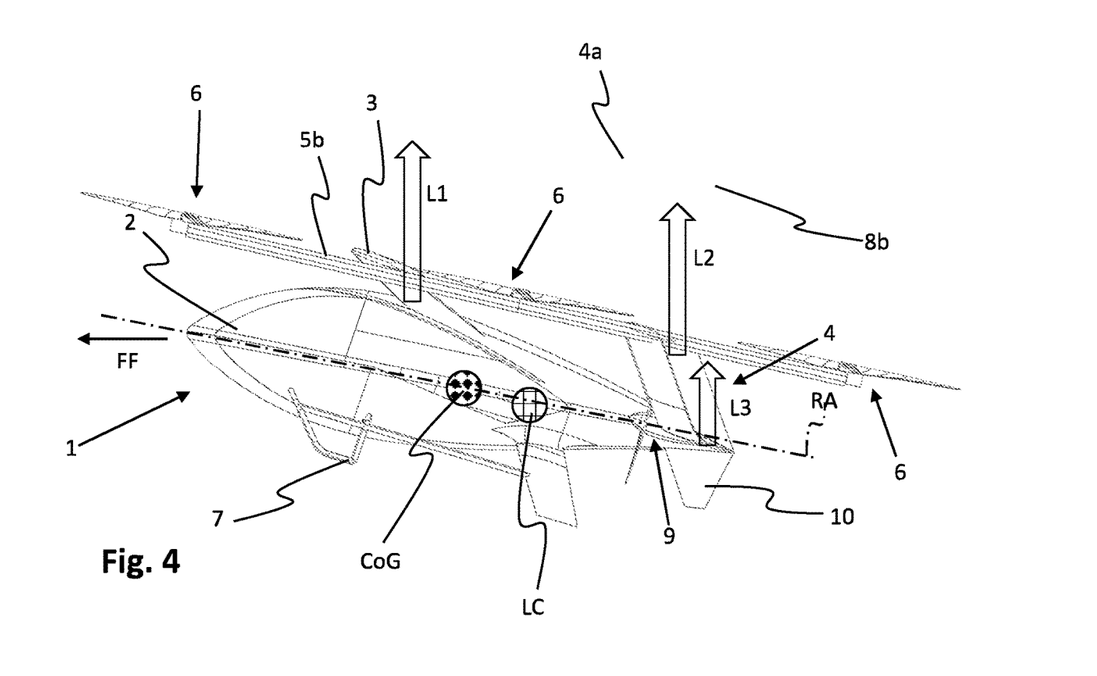
FIG. 4 shows the aircraft of FIG. 2 and forces acting thereupon in a nose-up configuration.

The opposite will happen if the aircraft 1 experiences a nose-up movement, as depicted in FIG. 4. The angle of attack on the wings increases, leading to an increased lift L1, L2, L3, (including possible stall effects if the angle of attack is too high). Yet due to the airfoil of the horizontal stabilizer (lower aft wing 4b) with less airfoil inclination (leading also to less stall sensitiveness), there results a positive lift force. In total, the lift of the wings aft of the CoG, i.e. upper aft wing 4a and lower aft wing 4b will produce a higher moment than the moment of the front wing 3, leading to a nose-down movement which stabilizes the aircraft 1 again.

$$M_{up}=L1^*x1-L2^*x2-L3^*x3$$

$$\rightarrow L2^*x2+L3^*x3=L1^*x1, \text{ being negative.}$$

Additionally, as previously stated, horizontally oriented propellers 9b or rotors (of the corresponding propulsion units 9) are installed on a horizontal stabilizing surface (lower aft wing 4b) which stabilizes the airflow around lower aft wing 4b, leading to a forced airflow due to the presence of the propellers 9b. This will reduce or avoid stall effects on the stabilizing wing (lower aft wing 4b) if the angle of attack is too high/low.

FIG. 5 shows a front elevational view of the aircraft 1. Please refer to the description of FIG. 1 for details and definition of reference numerals. FIG. 5 illustrates the fact that front wing 3 is inclined in an upward (positive z) direction from its contact (attachment) region with fuselage 2 towards its outer tips 3a. However, as can be further gathered from FIG. 5, in a vicinity of its tips 3a, front wing 3 may level off so that it becomes parallel with (upper) aft wing 4a. The propellers 6b on each side are located at different heights (larger z values from front to rear) for reduced interference. Side connecting beams 5a, 5b have decreased distance between them towards the rear of the aircraft 1. Vertical stabilizers 8a, 8b are inclined outwardly w.r.t. fuselage 2, their lower ends (attached to lower aft wing 4b) being closer to the fuselage 2 than their upper ends (attached to upper aft wing 4a). The vertical stabilizers 8a, 8b are essentially parallel to each other on respective sides of the aircraft 1. Upper aft wing 4a and lower aft wing 4b are essentially straight, with upper aft wing 4a being longer than lower aft wing 4b. The latter is attached directly to fuselage 2, while the former is attached indirectly to fuselage 2 via the vertical stabilizers 8a, 8b. Propellers 9b are arranged on respective sides of the fuselage 2, so that there is no geometrical overlap along roll axis RA.

Figure 6:
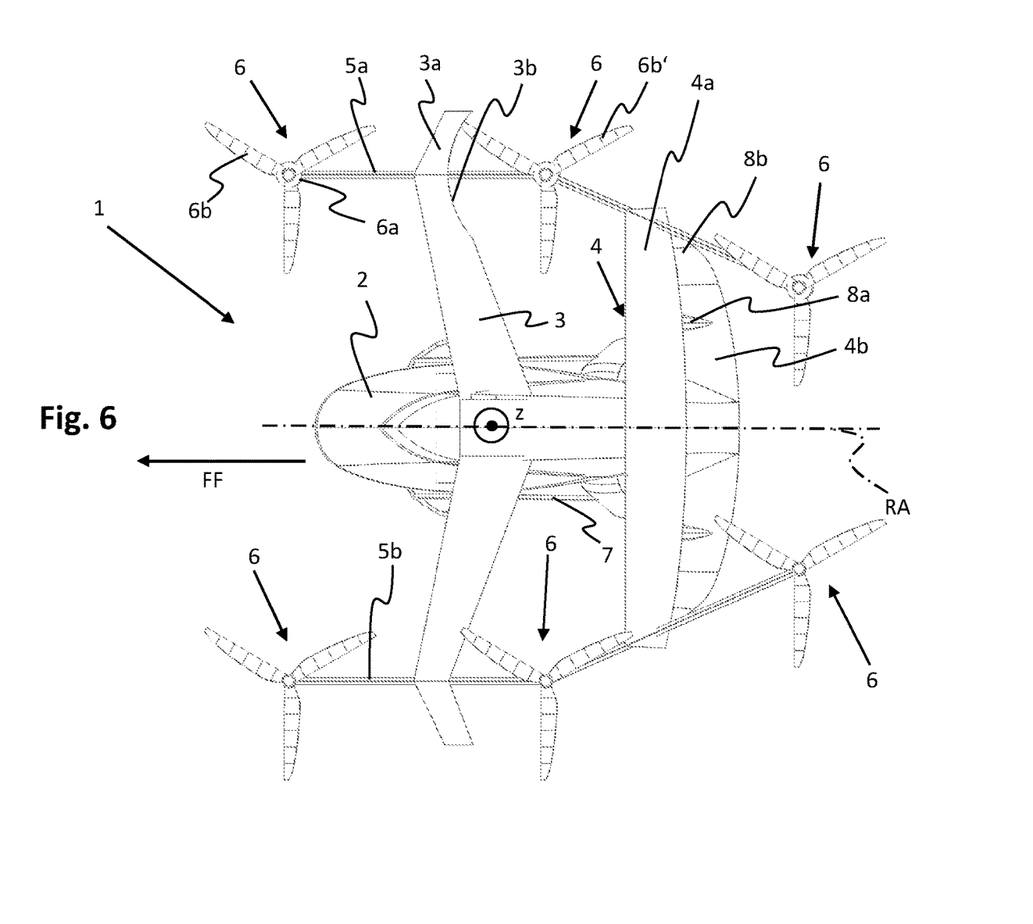
FIG. 6 shows the aircraft of FIG. 1 in a plan view.

FIG. 6 shows a plan view of the aircraft 1. Please refer to the description of FIG. 1 for details and definition of reference numerals. FIG. 6 nicely illustrates the fact that the front wing 3 has a forward sweep apart from its tips 3a, which are angled backwards, i.e., towards the rear of the aircraft 1. Upper aft wing 4a and lower aft wing 4b, respectively, have a straight configuration—at least in a region of their respective front edges. Their respective rear edges may be curved, as shown. Lower aft wing 4b may extend further towards the rear of the aircraft 1 than upper aft wing 4a.

As illustrated for the right side of the aircraft only, front wing 3 may have a recess 3b with circular contour, which contour corresponds to an outer contour of an area swept by adjacent propeller 6b'. This feature may further reduce interference and increase lift, since front wing 3 is not blocking any downward airstream generated by propeller 6b'. In this way, in the direction of forward flight, a distance between a propeller axis of said propeller 6b' and the front wing 3 at least corresponds to a radius of the corresponding propeller 6b'. This is true at least for the front-most propellers 6b as well. It should further be noted that owing to the proposed aircraft design, especially the proposed configuration of the connection beams 5, virtually no part of the aircraft structure is located below a propeller 6b, thus reducing blocking effects to a maximum. The connecting beams 5a, 5b may have an aerodynamic shape or outer contour for further reducing blocking effects.

Figure 7:
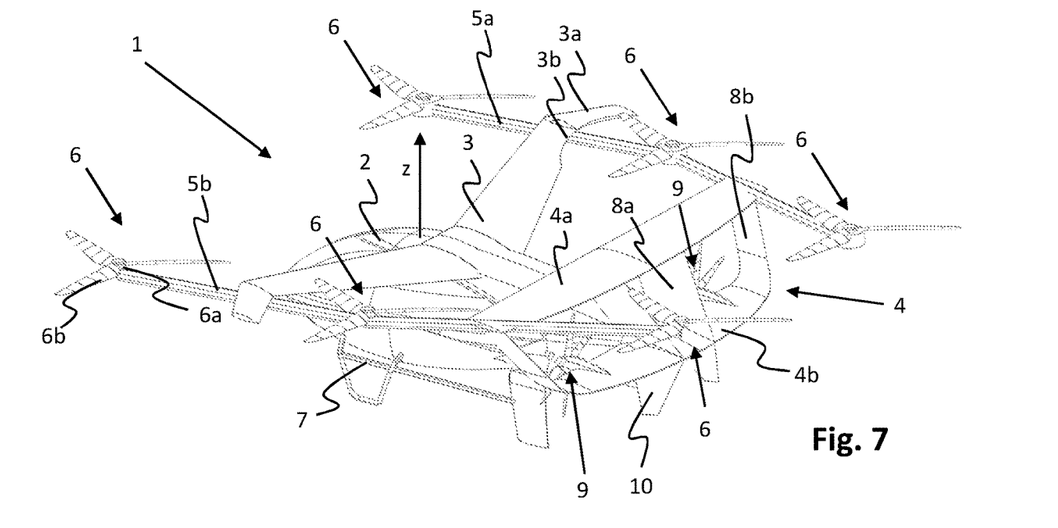
FIG. 7 shows the aircraft of FIG. 1 in a further perspective view.

FIG. 7 shows a further perspective view of the aircraft 1, as seen from the rear. Please refer to the description of FIG. 1 for details and definition of reference numerals. In particular, FIG. 7 discloses further details of the landing gear 7 toward the rear of the aircraft 1 and shows additional fin structures 10 below lower aft wing 4b.

Figure 8:
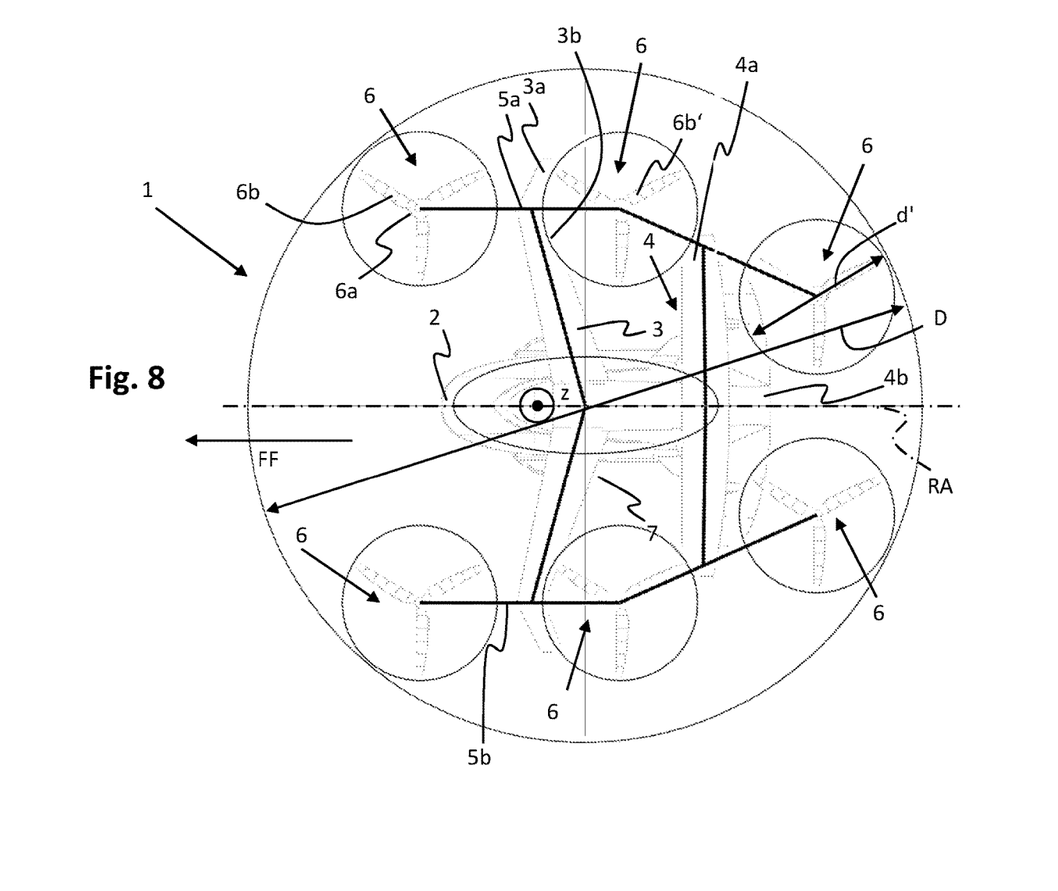
FIG. 8 shows the aircraft of FIG. 1 in a plan view with overlaid graphical annotations.

FIG. 8 illustrates that rotor diameters of the vertically oriented propellers 6b are about 25% of an overall dimension, D, of the aircraft 1, wherein D is the diameter of an imaginary circle laid around the aircraft 1, when looking along a yaw axis thereof. Generally, the propellers 6b should be as large as possible, without interfering with other parts of the aircraft structure, in particular in terms of blocking.

Although not depicted in the drawings, in case of at least three vertically oriented propulsion units 6, the two frontmost and the two aft-most propellers 6b, respectively, could have a larger diameter than the middle propellers 6b'.

In general, the direction of rotation of the lifting propellers 6b can be chosen so that the front propellers 6b (leftmost, e.g., in FIG. 8) run from "outside to inside", because this first row of propellers 6b is most efficient for creating lift (due to a lack of interference). Furthermore, a quadrant in which the lift is created is located on the outside, i.e. further away from the CoG, and therefore requires less force for position control.

The invention claimed is:
1. A VTOL aircraft (1), comprising:
a fuselage (2) configured for transporting at least one of passengers or load;
a front wing (3) attached to the fuselage (2);
an aft wing (4) attached to the fuselage (2), behind the front wing (3) in a direction of forward flight (FF);
a right connecting beam (5a) and a left connecting beam (5b), said connecting beams (5a, 5b) structurally connect the front wing (3) and the aft wing (4), said connecting beams (5a, 5b) are spaced apart from the fuselage (2); and
at least three propulsion units (6) on each one of the connecting beams (5a, 5b), said propulsion units (6) each comprise at least one propeller (6b, 6b') and at least one motor (6a) driving said propeller (6b, 6b'), and the propellers are arranged with respective propeller axes thereof in an essentially vertical orientation (z), with the propellers on each one of the connecting beams (5a, 5b) being located at different heights in the essentially vertical orientation (z), a respective height of the propellers on each one of the connecting beams (5a, 5b) increasing from front to rear, and the at least three propulsion units are each arranged directly on each one of the connecting beams.

2. The aircraft (1) according to claim 1, wherein the at least three propulsion units (6) on each of the connecting beams are arranged behind each other in the direction of forward flight (FF).

3. The aircraft (1) according to claim 1, further comprising at least one of:
the connecting beams (5a, 5b) extend in the direction of forward flight (FF) beyond the front wing (3), and at least one of the propulsion units (6) on each side is located on a respective one of the connecting beams (5a, 5b) in front of the front wing (3) in the direction of forward flight(FF); or
the connecting beams (5a, 5b) extend beyond the aft wing (4) in a rearward direction, and at least one of the propulsion units (6) on each side is located on a respective one of the connecting beams (5a, 5b) behind the aft wing (4).

4. The aircraft (1) according to claim 1, wherein the connecting beams (5a, 5b) extend parallel to the forward flight direction (FF).

5. The aircraft (1) according to claim 1, wherein a distance between the connecting beams (5a, 5b) decreases at least in a direction toward a rear of the aircraft (1) in the direction of forward flight (FF).

6. The aircraft (1) according to claim 1, wherein, in the direction of forward flight (FF) or opposite thereto, a distance between a propeller axis of the vertically oriented propulsion units (6) and any one of the front (3) and the aft wings (4) is at least as large as a radius of the corresponding propeller (6b, 6b').

7. The aircraft (1) according to claim 1, wherein a center of gravity (CoG) of the aircraft (1) is located between the front wing (3) and the aft wing (4) with respect to the direction of forward flight (FF), and a lifting center (LC) of the aircraft (1) is located aft the center of gravity (CoG) with respect to the direction of forward flight (FF).

8. The aircraft (1) according to claim 1, wherein rotor diameters of the vertically oriented propellers (6b, 6b') are between 10% <D<35% of an overall dimension, D, of the aircraft (1), wherein D is a diameter of an imaginary circle that encompasses the aircraft (1), when looking along a yaw axis (z) thereof.

9. The aircraft (1) according to claim 1, wherein the at least three of the propulsion units (6) are vertically oriented on each one of the connecting beams (5a, 5b), with two front-most and two aft-most ones of the propulsion units having middle ones of the propulsion units located therebetween and the propellers (6b) of two front-most and two aft-most of the propulsion units (6), respectively, have a larger diameter than the propellers (6b') of the middle ones of the propulsion units (6).

10. The aircraft (1) according to claim 1, wherein the motors are electric motors.

11. The aircraft (1) according to claim 1, wherein the aft wing (4) is a box-wing, comprising an upper aft wing (4a) and a lower aft wing (4b), said upper and lower aft wings (4a, 4b) are arranged distanced to each other in a direction along a vertical or yaw axis (z) of the aircraft (1) and are structurally connected by at least one outer vertical stabilizer (8b) located at corresponding ends of the upper aft wing (4a) and the lower aft wing (4b), respectively.

12. The aircraft (1) according to claim 11, wherein the lower aft wing (4b) is mechanically connected to a rear part of the fuselage (2), in the direction of forward flight (FF), and the upper aft wing (4a) is connected to the rear part of the fuselage (2) via at least one inner vertical stabilizer (8a).

13. The aircraft (1) according to claim 11, wherein the lower aft wing (4b) is symmetrical in a leading-to-trailing edge cross section, with less airfoil inclination with respect to the direction for forward flight (FF) than the front wing (3) and the upper aft wing (4a).

14. The aircraft (1) according to claim 1, further comprising at least one propulsion unit (9) for forward propulsion arranged at a rear of the fuselage (2) in the direction of forward flight (FF).

15. The aircraft (1) according to claim 14, wherein the at least one propulsion unit (9) for forward propulsion is located in front of a leading edge of the aft wing (4).

16. The aircraft (1) according to claim 14, wherein there are two of the propulsion units (9) for forward propulsion, with one being located on a right side of the fuselage and another being located on a left side of the fuselage (2), respectively.

17. The aircraft (1) according to claim 14, wherein a diameter (d) of the propeller (9b) of the at least one propulsion unit (9) for forward propulsion is dimensioned smaller than the propellers (6b) of the vertically oriented propulsion units (6), and have about 20%-80% of a diameter (d') of the propellers (6b) of the vertically oriented propulsion units (6).

18. A VTOL aircraft (1), comprising:
  a fuselage (2) configured for transporting at least one of passengers or load;
  a front wing (3) attached to the fuselage (2);
  an aft wing (4) attached to the fuselage (2), behind the front wing (3) in a direction of forward flight (FF);
  a right connecting beam (5a) and a left connecting beam (5b), said connecting beams (5a, 5b) structurally connect the front wing (3) and the aft wing (4), said connecting beams (5a, 5b) are spaced apart from the fuselage (2);
  at least three propulsion units (6) on each one of the connecting beams (5a, 5b), said propulsion units (6) each comprise at least one propeller (6b, 6b') and at least one motor (6a) driving said propeller (6b, 6b'), and the propellers are arranged with respective propeller axes thereof in an essentially vertical orientation (z), with the propellers on each one of the connecting beams (5a, 5b) being located at different heights in the essentially vertical orientation (z), a respective height of the propellers on each one of the connecting beams (5a, 5b) increasing from front to rear; and
  wherein the connecting beams rise or slant upwards from the front to the rear of the aircraft in a vertical direction.

* * * * *